June 15, 1943.  E. S. KAELIN  2,322,139
SAFETY VALVE
Filed Feb. 18, 1942
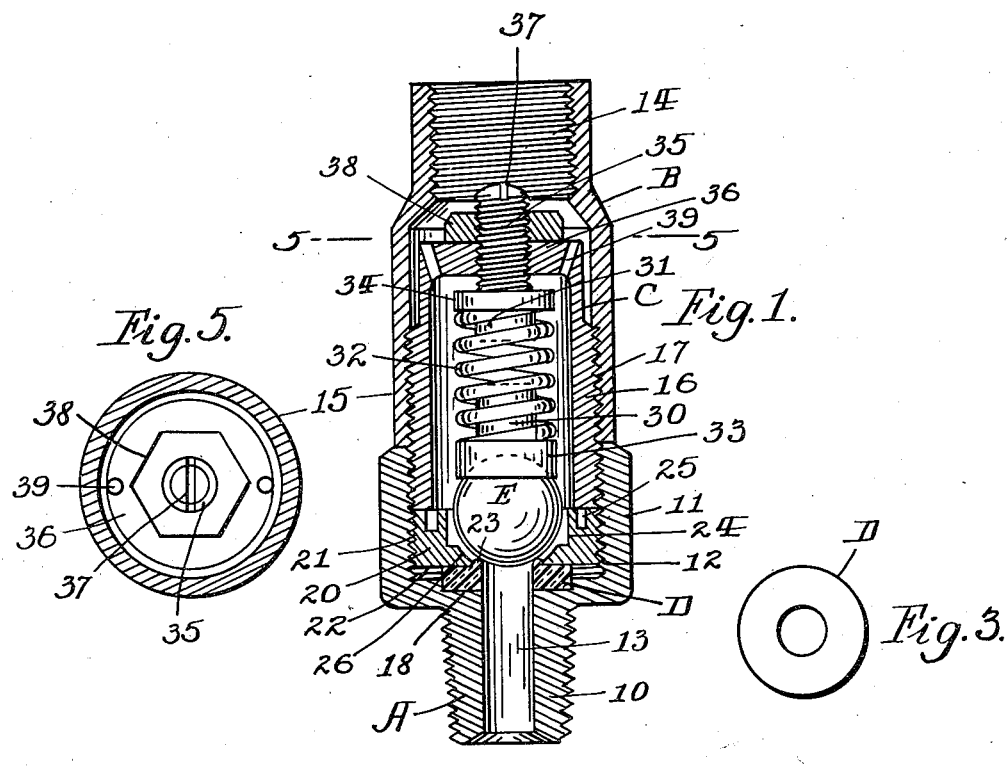
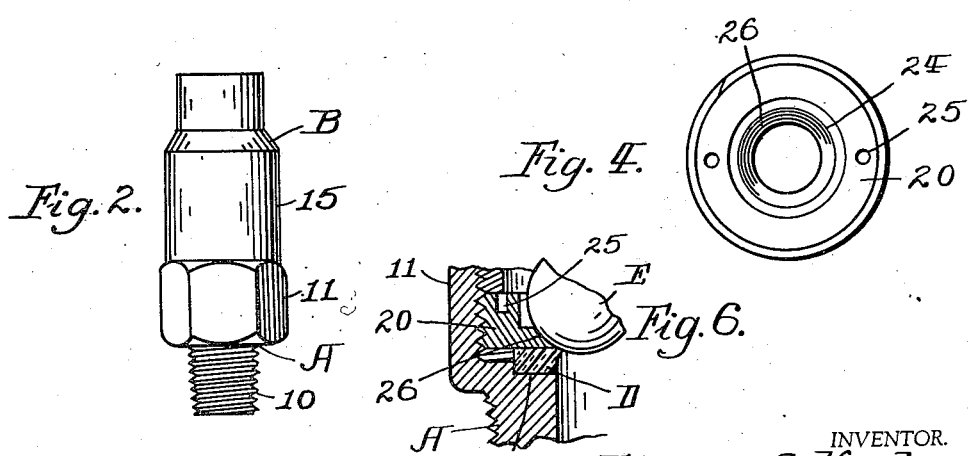
INVENTOR.
Edward S. Kaelin,
BY
Attorney.

Patented June 15, 1943

2,322,139

UNITED STATES PATENT OFFICE 2,322,139

SAFETY VALVE

Edward S. Kaelin, Los Angeles, Calif., assignor to Frederick C. Kingston, Los Angeles, Calif.

Application February 18, 1942, Serial No. 431,375

2 Claims. (Cl. 137—53)

My invention relates to improvements in safety valves which are intended for continuously maintaining predetermined fluid pressure in a container without leaking and which will instantly release any excessive pressure. In the storage of gas and other types of fluid, such as oxygen, acetylene, air, liquids, etc., under comparatively high pressure, difficulty has heretofore been experienced in providing a construction of safety valve which for long duration will not leak and which will function correctly and from time to time instantly release any excessive pressure caused by changes in temperature or other eventualities. It is the primary object of this invention, among others, to overcome this objection and to provide a safe, sensitive structure which normally will seal a container against leaking and which is simple, inexpensive and dependable for protecting a container against any excessive internal pressure. A further and important object is to provide a safety valve which will instantly pop fully open or completely close without intervening "trickling". The latter tends to cut the valve seat and cause objectionable leaking. This objection is also overcome by the improved composite valve seat provided by my improvement.

In the accompanying drawing forming part of this specification, Fig. 1 is a central longitudinal section of my improved safety valve; Fig. 2 is a side elevation, on reduced scale, of my improved safety valve; Fig. 3 is a plan of the resilient valve seat element used in the device; Fig. 4 is a plan of the retainer element; Fig. 5 is a section taken on the line 5—5 of Fig. 1; and Fig. 6 is a section of a detail.

My improved safety valve is disclosed in combination with a pair of male and female coupling elements A and B, mounted upon an internal cage C. These elements form a suitable housing for my improved valve assembly. The male coupling element is provided with an externally threaded nipple 10 having an enlarged polygonal flat sided nut 11, internally threaded at 12, through which the axially disposed inlet duct 13 traverses. The female coupling element has an internally threaded outlet duct 14 for conducting the exhaust from the valve and an internally threaded cylindrical body 15. The coupling elements thus provided are for connecting the safety valve with a service duct with which the device is intended for use and they may be modified to suit any type of coupling. These coupling elements are threadedly engaged to the cage C, the latter being formed with a cylindrical sleeve 16 externally threaded at 17. The member A screws onto the cage body 15 of and extends axially from one end thereof while the body member B screws onto the cage body and extends axially from the opposite end thereof. When these parts are fully adjusted they lock endwise together to prevent loosening and to form a fluid tight housing.

The coupling element A is formed with an annular inner end socket 18 concentric with the inner end of duct 13 in which is tightly seated a concentric correspondingly shaped and sized resilient annular valve seat member D. This valve seat member resembles a flat disk or annulus and is made out of wear resisting elastic material such as Neoprene, rubber, or any other suitable resilient material. The valve seat member D is held tightly in the socket 18 by means of an adjustable inelastic retainer 20 which resembles a circular nut externally threaded at 21. This retainer is threadedly engaged with the inner surface of the coupling element A. The inner end of the retainer is flat and forms an abrupt inwardly extending shoulder 22 which is adapted to bear down under pressure upon the outer end surface of the resilient valve seat member so as to extrude by the even flow of the resilient material and produce an inner annular up-standing bead 23, concentric with cup 26, of the material when the retainer 20 is adjusted by screwing tightly into the coupling element A. The bead and cup cooperate together to produce a composite valve seat. The valve E resembles a ball but may be of any usual type and is adapted to close upon and compress the bead 23 and produce a tight wear resistant closure. The retainer 20 is provided with a central passage 24 having clearance space for the free working of the valve. The cup 26 corresponds with the outer contour of the valve so that when the bead is fully compressed the valve also closes tightly in the cup as shown in Fig. 6. The cooperating resilient and inelastic valve seat members thus produce a composite leak proof and wear resistant valve seat which is highly effective in preventing cutting action.

The retainer also has wrench engaging openings 25 in its outer end so that a suitable hand wrench can be applied for turning and adjusting it. In use the hollow cylindrical body of the cage element C is screwed into the nut 11 until its inner end presses tightly against the retainer to lock the retainer against turning, after the latter has been adjusted. Locking the coupling elements A and B together as above described also serves to lock the sleeve 16 from releasing the retainer 20 which is a distinct advantage.

The cage element carries the coaxially arranged adjustable valve compression assembly which comprises a pair of studs 30 and 31 over which the opposite ends of the expansive helical spring 32 are engaged. The stud member 30 has a valve holding cup 33 in which the ball valve E bears freely and against which one end of the spring 32 also bears. The opposite stud member 31 has an abutment collar 34 against which the opposite end of spring 32 presses and a threaded shank 35 which is screw threaded through the outer end 36 of the cage. By turning this shank with the assistance of a screw driver applied in the slot 37, the pressure of the spring 32 exerted upon the ball valve E may be regulated so that the safety valve will release and open the passage through the housing at any predetermined pressure desired. Normally the valve is held closed upon its seat by the compression assembly. A lock nut 38 threaded upon the shank 35 is adapted to bear upon the outer end of the cage and hold the shank from turning when the latter has been regulated to release the valve at any desired pressure of the fluid medium escaping through the valve. Suitable vent openings 39 through the outer end 36 of the cage allow the fluid pressure medium released by the valve to escape longitudinally through the housing.

In operation the compression assembly is regulated to normally hold valve E closed upon the composite valve seat and to instantly fully release under any predetermined excessive pressure. When closed the bead 23 of the resilient valve seat is compressed into the position shown in Fig. 6, until the valve seats in the inelastic cup 26 of the non-compressible retainer. In this condition the portion constituting the annular bead 23 and the cup 26 cooperating together produce a tight seat which prevents any leakage and insures the correct functioning of the valve when subjected to the slightest excessive pressure.

The combination of the two elements D and 20, constituting the composite valve seat and clamping them together under pressure produces an evenly extruded bead upon which the valve closes. This reduces the tendency of the valve seat cutting, due to "trickling" of the compressed fluid between the valve and its seat. The resiliency of the bead 23 in cooperation with the inelastic cup further causes the valve to pop wide open instantly when the slightest excessive fluid pressure occurs.

Various modifications of the construction within the spirit of the invention are contemplated.

I claim:

1. A valve assemblage, comprising, an internal cage, a pair of oppositely disposed coupling elements threadedly engaged to lock endwise together over said cage, one of said coupling elements having an inner end socket, a composite valve seat composed of a centrally disposed flat resilient annulus held in said socket and forming part of the valve seat, and a retainer having a cup with a central aperture concentric with said annulus, said retainer being threadedly engaged with the inner wall of the coupling element containing said end socket in position to be engaged and locked against turning by the inner end of said cage and when screwed tightly against the end surface of said resilient annulus extruding a bead therefrom concentric with and in cooperation with said cup forming a valve seat, a valve disposed to cooperate with said seat and an adjustable spring assembly held in said cage for releasably urging the valve upon said seat under predetermined pressure.

2. In a structure as defined in claim 1, the adjustable spring assembly comprising a pair of studs, one of which is adjustably secured in said cage and the other impressed against the valve, and a spring acting under compression interposed between said studs and regulated in tension by the adjustment of the adjustable stud to regulate the pressure of the valve upon its seat.

EDWARD S. KAELIN.